2,783,244

PREPARATION OF N-ETHYLCARBAZOLE FROM ANTHRACENE PITCH

Saul R. Buc, Easton, Pa., David I. Randall, New Vernon, and Carl M. Smith, Westfield, N. J., and Robert D. Jackson, Binghamton, N. Y., assignors to General Aniline & Film Corporation, New York, N. Y., a corporation of Delaware No Drawing. Application February 9, 1956, Serial No. 564,362

2 Claims. (Cl. 260—318)

The invention here presented is a new and useful process for the preparation and purification of N-ethylcarbazole; utilizing as the raw material crude anthracene pitch.

N-ethylcarbazole is found to be an excellent, high-boiling solvent and also a valuable intermediate for many organic reactions particularly in the preparation of a pigment of the dioxazine class. Many attempts have been made toward the purification of anthracene pitch and the recovery of both anthracene and carbazole but those processes which were adequate were found to be unduly expensive and those which were reasonable in cost were not adequate to produce sufficiently pure materials. This difficulty stems primarily from the closely similar characteristics of anthracene and carbazole which makes their separation by any of the usual chemical reactions extremely difficult.

The present invention provides a simple procedure for the simultaneous purification of anthracene and production of N-ethylcarbazole.

Broadly, the procedure consists in a preliminary separation and purification of the crude pitch, by crystallization from a halogenated aromatic solvent such as a chlorobenzene, to separate the anthracene and carbazole from the other components of the pitch such as phenanthrene, acridine, fluorene, and the like. The resulting nearly pure mixture of anthracene and carbazol is then alkylated with diethyl sulfate and caustic potash in aqueous acetone. The alkylation converts the carbazole to N-ethylcarbazole and the anthracene which is highly insoluble in dilute aqueous acetone is precipitated, while the N-ethylcarbazole remains in solution from which it may be separated by still further dilution with water to precipitate it and permit of separation by filtration. It may be noted that this procedure results in anthracene having a purity between 90 and 95%, and the recovered N-ethylcarbazole has a purity between 80 and 90% and may contain as little as 4% of anthracene.

Thus the process of the present invention separates anthracene in a condition of high purity from crude pitch and produces N-ethylcarbazole also of high purity as a concomitant portion of the same procedure. Other objects and details of the invention will be apparent from the following description.

The process starts with crude anthracene, or coal tar pitch. A suitable amount of this raw material is heated with about twice its weight of chlorobenzene to 120° C. and resulting solution is then filtered through a suitable filter such as a muslin to remove insoluble rubbish such as bits of wood, gravel and the like. The filter cloth is desirably washed with boiling chlorobenzene. The filtrate is allowed to cool for a number of hours; during which time the anthracene and carbazole precipitate together. The crystaline precipitate is filtered off leaving the minor impurities such as phenanthrene, acridine, fluorene, and the like in solution in the cold chlorobenzene from which they may be recovered by appropriate separation procedures if desired.

The crystallized mixture of anthracene and carbazol is then dried under vacuum for a number of hours and then dried at 40° C. for several days to remove as nearly as possible all of the chlorobenzene. The average pitch will yield a crystallized product containing approximately 37% of carbazole.

This crystallized mixture is then placed in an appropriate reactor with an appropriate amount of aqueous acetone, and a suitable amount of potassium hydroxide. The resulting mixture is then heated to reflux temperature and when this condition is reached, an appropriate amount of diethyl sulfate is added, with stirring, at a relatively slow rate. The product is continued at reflux temperature for several hours, whereupon a substantial amount of water is added and the stirring continued for a short time longer. By this procedure there is obtained a two-layer mixture, the lower layer consisting in large part of water, the upper layer being a brown organic material layer.

The anthracene is substantially insoluble in both layers, and collects at the interface. The mixture is then filtered to separate the solid anthracene from the remainder of the mixture. The solid anthracene may then be washed by suitable repeated treatments with methanol, and the resulting purified anthracene is found to have a purity in the close neighborhood of 93%. Simultaneously, the filtrate is allowed to stand for the oily layer to rise to the surface, whereupon the oily organic layer is separated, mixed with the methanol washes and diluted with a quantity of water. The water causes the N-ethylcarbazole to precipitate as solid, light brown crystals which may be filtered off, washed well with water and dried at room temperature to constant weight. The resulting N-ethylcarbazole is found to have a purity of approximately 83% and it may contain a little over 4% of anthracene. The yield of N-ethylcarbazole is found to be approximately 87% of the carbazole present in the crude anthracene pitch.

EXAMPLE 1

A process schedule for commercial production of the purified anthracene and purified N-ethylcarbazole is as follows:

A. *Crystallization of crude anthracene pitch*

1000 parts of crude anthracene pitch plus
2000 parts chlorobenzene were heated to 120° C. and filtered through a muslin cloth. This removes bits of wood, gravel, etc. The filter cloth is washed with
250 parts boiling chlorobenzene. The filtrate is allowed to stand at room temperature overnight. The crystalline product is filtered off, washed with
250 parts cold chlorobenzene and pulled down for 5 hours under vacuum. It is then dried at about 40° C. for 65 hours. Yield 282 parts, 35.5%.

The percentage of carbazole in the crystallized pitch amounts to 37% based on the nitrogen analysis.

B. *Ethylation of carbazole fraction*

In a suitable, 4 necked flask, equipped with stirrer and dropping funnel is placed
67.5 parts crystallized anthracene pitch (37% based on nitrogen analysis; 0.177 moles equivalent to 39.6 parts 100% material)
350 parts 94% (vol.) acetone and
35 parts 96 wt. percent aqueous potassium hydroxide (prepared by dissolving 66 parts of 85% pure KOH pellets in 34 parts water).

The above mixture is heated to reflux and then there is added
35 parts diethyl sulfate, over a period of twenty minutes. The steam-bath is removed during the addition.

After refluxing for 2.5 hours, 250 parts of water are added and stirring continued another 20 minutes. The reaction mixture now consists of an upper brown organic layer and a lower aqueous layer. The insoluble anthracene collects at the interface. The mixture is next filtered on a Büchner funnel and the oily layer of the filtrate separated and set aside. The anthracene crystals are washed on the funnel with three 100 parts portions of methanol.

The anthracene is then dried in an oven at 750° C. Yield 44.5 parts, 93% purity.

The organic layer and methanol washes are combined and stirred up vigorously with 300 parts of water. This causes the N-ethylcarbazole to solidify. After standing about 18 hours, the resultant light brown crystalline product is filtered off, washed well with water and dried in the open to constant weight.

Yield N-ethylcarbazole, 36.2 parts.

Purity, 83.1%; contains 4.3% anthracene.

Yield corrected for purity is 31.0 parts, 87% of theory.

Thus the process of the invention yields simultaneously a purified anthracene of excellent quality and N-ethylcarbazole of excellent quality and high yield. The procedure is particularly advantageous for the preparation of N-ethylcarbazole as an intermediate for the preparation of pigment, particularly of the dioxazine class, as well as various other dye stuffs, pharmaceuticals and the like, and the above outlined procedure is particularly desirable because of the low cost of the purified materials.

While there are above disclosed but a limited number of embodiments of the invention it is possible to provide still other embodiments without departing from the inventive concept herein disclosed; and it is therefore desired that only such limitations be imposed upon the appended claims as are stated therein or required by the prior art.

The invention claimed is:

1. A process for the simultaneous purification of anthracene and carbazole comprising the steps in combination of solvent extracting a mixture of anthracene and carbazole from crude pitch, treating the extracted mixture of anthracene and carbazole with an aqueous ketone solution containing an alkali metal hydroxide and adding diethyl sulphate thereto, thereafter separating undissolved anthracene and precipitating N-ethylcarbazole by the addition of water to the filtrate.

2. A method for the simultaneous recovery of purified anthracene and production of N-ethylcarbazole from crude anthracene pitch comprising the steps in combination of dissolving the pitch in hot chlorobenzene and filtering out insoluble impurities, cooling the chlorobenzene to precipitate a mixture of anthracene and carbazole; treating the purified mixture of anthracene and carbazole with aqueous acetone, caustic potash, and diethyl sulphate at reflux temperature to produce a two-layer fluid and insoluble anthracene; then filtering out the insoluble anthracene, separating the bottom aqueous layer from the organic layer of the filtrate, and diluting the organic layer with water to precipitate crystalline N-ethylcarbazole.

No references cited.